3,088,970
OXIDATION OF POLYETHERS
Howard R. Guest, Charleston, and Ben W. Kiff, Ona, W. Va., assignors to Union Carbide Corporation, a corporation of New York
No Drawing. Filed Mar. 6, 1961, Ser. No. 93,339
8 Claims. (Cl. 260—496)

This invention relates to a novel process for the oxidation of glycol ethers to obtain formate and acetate esters.

In another aspect, this invention relates to a novel process for the production of glycols by the oxidation of high molecular weight ethers to obtain esters followed by the hydrolysis of the esters to yield ethylene glycol, propylene glycol, diethylene glycol or dipropylene glycol.

The glycol ethers which can be oxidized by the novel process of this invention can be represented by the general formula:

$$RO(CHR'CH_2O)_nH$$

wherein R' represents hydrogen and a methyl group, R represents hydrogen and an alkyl group of from 1 through 12 carbon atoms and $n$ is a whole integer from 2 to 300. The preferred value for $n$ is from 2 to 20.

Illustrative glycol ethers corresponding to the above general formula include:

$CH_3OCH_2CH_2OCH_2CH_2OH$
$HO(CH_2CH_2O)_2H$
$C_2H_5O(CH_2CH_2O)_2H$
$C_4H_9O(CH_2CH_2O)_2H$
$C_8H_{17}O(CH_2CH_2O)_2H$

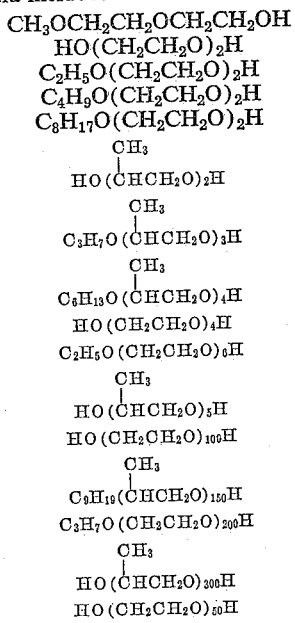

$$HO(\overset{\underset{|}{CH_3}}{C}HCH_2O)_2H$$

$$C_3H_7O(\overset{\underset{|}{CH_3}}{C}HCH_2O)_3H$$

$$C_6H_{13}O(\overset{\underset{|}{CH_3}}{C}HCH_2O)_4H$$

$HO(CH_2CH_2O)_4H$
$C_2H_5O(CH_2CH_2O)_6H$ $$HO(\overset{\underset{|}{CH_3}}{C}HCH_2O)_5H$$

$HO(CH_2CH_2O)_{100}H$ $$C_9H_{19}(\overset{\underset{|}{CH_3}}{C}HCH_2O)_{150}H$$

$C_3H_7O(CH_2CH_2O)_{200}H$ $$HO(\overset{\underset{|}{CH_3}}{C}HCH_2O)_{300}H$$

$HO(CH_2CH_2O)_{50}H$

The glycol ethers referred to above are well known in the art and can be easily obtained. However, a particular advantage of our novel process is when the starting glycol ethers are obtained as by-products from ethylene oxide and propylene oxide reactions.

Both ethylene oxide and propylene oxide are very valuable compounds and are used to prepare many commercially important derivatives. Among these derivatives are the mono-alkyl ethers of ethylene glycol and propylene glycol which are well known in the art as effective solvents for use in paint and plastics industries. Illustrative of these mono-alkyl ethers are the mono-ethyl, mono-methyl and mono-butyl ethers of ethylene glycol and propylene glycol. These ethers are prepared by the addition of ethylene oxide or propylene oxide to appropriate alcohols under well recognized conditions. Other derivatives of ethylene oxide and propylene oxide are the polyethylene oxides and polypropylene oxides. These derivatives are also well known in the art and are manufactured in large amounts in the chemical industry. In the manufacture of these derivatives there is also obtained a large percentage of glycol ethers as by-products. The glycol ethers obtained usually have little commercial importance and thus increase the operating cost for producing the desired derivatives.

It has now been found that when these glycol ether by-products are oxidized in the liquid phase in the presence of an oxygen-containing gas and particular metallic catalysts, surprisingly, they can be converted predominately into simple formate or acetate esters. The esters which can be obtained by the novel process of this invention are predominately ethylene glycol diformate, ethylene glycol monoformate, diethylene glycol monoformate and mixtures of the acetate and formate esters of propylene glycol and diproplene glycol. These esters are well known in the art and have commercial applications as solvents in various processes. The reason why oxidation of certain glycol ethers yields predominately acetate and formate esters is not completely understood. However, the fact remains that the long carbon chain is disrupted in some manner to yield the simple esters mentioned above.

The process of our invention is carried out by introducing an oxygen-containing gas into a vessel which contains one or more of the glycol ethers. The temperature and pressure is not narrowly critical and can vary over wide ranges. The preferred range for the temperature is from 75 to 200° C. and for the pressure is from 50 to 1000 p.s.i. The particularly preferred ranges are from 100 to 200° C. and from 50 to 200 p.s.i. It is to be understood that when pure undiluted oxygen is used as the oxidizing agent more moderate conditions can be employed than when air is used as the oxidizing agent. The catalysts employed in the process of the invention are critical. It has been found that the desired results can be obtained when the oxidation is carried out in the presence of heavy metals such as cobalt, manganese, nickel or chromium. These metals can conveniently be added in the form of their salts such as naphthanates, acetates, nitrates, phosphates, and 2-ethylhexanoates. The amount of catalyst employed may vary over wide ranges. The preferred amount is from 1 to 5000 p.p.m. by weight of the metal based on the material being oxidized. The particularly preferred amount of catalyst is from 100 to 1000 p.p.m.

A preferred way of conducting the oxidation is to charge the material to be oxidized and the catalyst into a reaction vessel and then heat it to the desired temperature. The oxidizing gas is then gradually added to the reaction vessel under the specified pressure. Mechanical stirring can be employed if it is so desired or a reaction vessel can be chosen of sufficient small cross-sectional area so that the agitation caused by the added oxidizing agent is sufficient without any mechanical stirring. The esters can then be recovered by conventional means such as distillation.

In another aspect of this invention, the esters resulting from the oxidation of the glycol ethers are not recovered, but water is added to the reaction vessel and the esters are hydrolyzed to yield predominantly ethylene glycol, propylene glycol, diethylene glycol and dipropylene glycol.

This novel method of producing free glycols has many potential advantages in commercial applications. Thus, it can readily be seen that one can utilize by-products which have but little commercial significance and be able to obtain glycols which are readily salable products. Thus, depending on the need of the operator or the influence of market conditions, the novel process of this invention allows for the production of either esters or free glycols.

The following examples will illustrate the novel process of this invention.

EXAMPLE 1

*Oxidation of Ethoxy Triethylene Glycol*

The reactor employed for the oxidation was a three-inch I.D. stainless steel tube 62 inches long. The lower 23 inches of the reactor were jacketed with a shell through which steam was circulated. The temperature of the steam was regulated by passing it through a mixing faucet by means of which water could be admitted as needed. A cooling coil extended into the reactor through the top to allow condensation of vapors in the effluent gas if desired.

Temperature measurements were made through a thermowell extending into the reactor. A sample line entered the wall just above the heating jacket and extended nearly to the bottom of the reactor. Compressed air was admitted from a cylinder through a line entering the bottom of the reactor and from there through a diffuser into the liquid. The effluent gas passed from the reactor through a control valve by means of which the pressure on the system was regulated.

To this reactor there was charged a mixture of 4652 grams of ethoxy triethylene glycol and 4.6 grams of cobalt Nuodex solution. (Cobalt Nuodex is a commercial product which is a solution of cobalt naphthenate. The solution contains 6% cobalt by weight calculated as the metal.) Air was passed through this solution at the rate of 264 liters/hr. while the pressure on the system was maintained at 150 p.s.i. The temperature was held at 100° C. for five hours. When the reaction began to diminish the temperature was increased to 135° C. for two hours. During this period the effluent gas contained 4% $O_2$ and 4.5% $CO_2$.

The reaction was concluded and the product was distilled. After removal of the water and acetic acid formed as by-products in the reaction, two broad fractions were collected. One boiled at 75° C./20 mm. to 102° C./10 mm. and the other at 102° C./10 mm. to 140° C./10 mm.

Redistillation of these cuts gave compounds which were identified as ethylene glycol diformate and diethylene glycol monoformate. Some of an intermediate material was obtained which was found to be ethylene glycol monoformate. Identification was made by comparison with properties of authentic samples of the esters.

Confirmation of the identification was made by the following procedure: the material which was identified as ethylene glycol diformate was reacted with an excess of methanol in the presence of 0.2% alkanesulfonic acid catalyst. The mixture was refluxed and the distillate was identified as methyl formate. The distillation was continued and after all the volatile material was removed the residue was found to be ethylene glycol. From the amount of methyl formate recovered it was calculated that the starting material was ethylene glycol diformate. The same procedure was followed to confirm the identification of the other two esters.

From the starting ethoxy triethylene glycol there was obtained a yield of 29 percent to ethylene glycol diformate, 23 percent to diethylene monoformate and 9 percent to ethylene glycol monoformate. Unreacted ethoxy triglycol equivalent to 15 percent of that charged was recovered. The total yield to useful glycol esters was therefore 61 percent with an efficiency of about 72 percent. The product contained about 8.5 percent of high-boiling residues. The remainder of the loss of efficiency was accounted for by the formation of carbon oxides, water and low-boiling acids and esters.

EXAMPLE 2

*Oxidation of Triethylene Glycol*

To the apparatus described in Example 1 there was charged 3891 grams of triethylene glycol and 3.8 grams of cobalt Nuodex solution. Air was passed through the liquid at the rate of 254 liters/hr. at 150 p.s.i. and a temperature of 150–160° C. After six hours the reaction was terminated and the product was distilled. The compounds made in Example 1 by the oxidation of ethoxytriethylene glycol were also found in the product mixture from this reaction. The yields were 25% to ethylene glycol diformate, 32% to diethylene glycol monoformate and 6% to ethylene glycol monoformate.

The total yield to useful products was therefore 63 percent. Of the triethylene glycol charged, 9.8 percent was recovered unchanged. The efficiency to total useful products was therefore about 70 percent. The product contained 14.8 percent of high-boiling residues. The remainder of the loss in efficiency was accounted for by the formation of carbon oxides, water, and low-boiling acids and esters.

EXAMPLE 3

*Oxidation of Poly(Propylene Glycol)*

To the reactor described in Example 1 there was charged a mixture of 2500 grams of poly(propylene glycol) with a molecular weight of about 2000 and 5 grams of cobalt acetate. Air was passed through the liquid at the rate of 756 liters/hr. while the temperature was held at 150° C. at a pressure of 150 p.s.i. The reaction was conducted for three hours.

The volatile material was distilled away from unreacted poly(propylene glycol). Upon redistillation of this material acetic acid was obtained as a heads cut and the remainder was found to consist of a mixture of acetates and formates of propylene glycol and dipropylene glycol. About half of the poly(propylene glycol) charged was converted to the ester mixture.

What is claimed is:

1. A process for preparing esters which comprises heating a glycol ether corresponding to the formula:

$$RO(CHR^1CH_2O)_nH$$

wherein R is selected from the group consisting of hydrogen and alkyl groups of from 1 through 12 carbon atoms, $R^1$ is selected from the group consisting of hydrogen and methyl, and $n$ is a positive integer from 2 through 300, in the presence of an oxygen-containing gas at a temperature from 75 to 200° C., and at a pressure of 50 to 1000 p.s.i. in contact with a salt of the metal cobalt.

2. The process of claim 1 wherein water is added to the reaction products.

3. The process of claim 1 wherein the temperature is from 100–200° C. and the pressure is from 50–200 p.s.i.

4. The process of claim 1 wherein the glycol ether is triethylene glycol.

5. The process of claim 1 wherein the glycol ether is polypropylene glycol.

6. The process of claim 1 wherein the glycol ether is epoxy triethylene glycol.

7. The process according to claim 1 wherein the salt is cobalt naphthenate.

8. The process according to claim 1 wherein the salt is cobalt acetate.

No references cited.